US012293192B2

United States Patent
Burgess et al.

(10) Patent No.: US 12,293,192 B2
(45) Date of Patent: May 6, 2025

(54) BUNDLING AND DYNAMIC ALLOCATION OF REGISTER BLOCKS FOR VECTOR INSTRUCTIONS

(71) Applicant: SiFive, Inc., San Mateo, CA (US)

(72) Inventors: Bradley Gene Burgess, Sunset Valley, TX (US); David Kravitz, Cambridge, MA (US); Alexandre Solomatnikov, San Carlos, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/140,792

(22) Filed: Apr. 28, 2023

(65) Prior Publication Data

US 2024/0362025 A1    Oct. 31, 2024

(51) Int. Cl.
*G06F 9/30* (2018.01)
*G06F 9/38* (2018.01)

(52) U.S. Cl.
CPC ........ *G06F 9/3836* (2013.01); *G06F 9/30036* (2013.01); *G06F 9/30123* (2013.01)

(58) Field of Classification Search
None
See application file for complete search history.

(56) References Cited

U.S. PATENT DOCUMENTS

| | | | | |
|---|---|---|---|---|
| 2012/0300850 A1* | 11/2012 | Yie | ........................ | H04N 19/44 375/E7.256 |
| 2014/0281397 A1* | 9/2014 | Loktyukhin | ........ | G06F 9/30094 712/208 |
| 2016/0378470 A1* | 12/2016 | Yasin | .................. | G06F 9/30076 712/226 |
| 2018/0217840 A1* | 8/2018 | Eyole | .................. | G06F 9/30141 |
| 2020/0019402 A1* | 1/2020 | Walters | ............... | G06F 9/30181 |
| 2020/0285482 A1* | 9/2020 | Francois | ............... | G06F 9/3836 |
| 2021/0311735 A1* | 10/2021 | Moudgill | ............ | G06F 9/38585 |
| 2022/0417005 A1* | 12/2022 | Patel | ..................... | H04L 9/0822 |
| 2023/0064455 A1* | 3/2023 | Eyole | .................. | G06F 9/30043 |
| 2024/0020126 A1* | 1/2024 | Waterman | ............. | G06F 9/3017 |
| 2024/0184571 A1* | 6/2024 | Brunie | .................. | G06F 9/3012 |
| 2024/0184576 A1* | 6/2024 | Burgess | .............. | G06F 9/30036 |
| 2024/0362025 A1* | 10/2024 | Burgess | ................ | G06F 9/3012 |
| 2024/0404046 A1* | 12/2024 | Yu | ........................ | G06V 10/242 |

OTHER PUBLICATIONS

What is instruction fusion in contemporary x86 processors?, Jun. 2, 2019 (Year: 2019).*

* cited by examiner

Primary Examiner — Hyun Nam
(74) Attorney, Agent, or Firm — Kilpatrick Townsend & Stockton LLP

(57) ABSTRACT

Apparatus and methods which bundle micro-operations with respect to a vector instruction, dynamically allocate register blocks for a vector instruction, and track the registers using valid bits. A method includes decoding, by a decoder, a vector instruction having a length multiplier of at least two into a number of micro-operations less than the length multiplier, allocating, by an issue queue, an issue queue entry to each of the number of micro-operations and executing, by the issue queue with execution units, each of the number of micro-operations a number of times from the issue queue entry to collectively match the length multiplier.

21 Claims, 10 Drawing Sheets

FIG. 4

BUNDLING AND DYNAMIC ALLOCATION OF REGISTER BLOCKS FOR VECTOR INSTRUCTIONS

TECHNICAL FIELD

This disclosure relates generally to integrated circuits and, more specifically, processing of vector instructions.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 are diagrams of example micro-operation(s) generated from a vector instruction.

DETAILED DESCRIPTION

Figure 1:
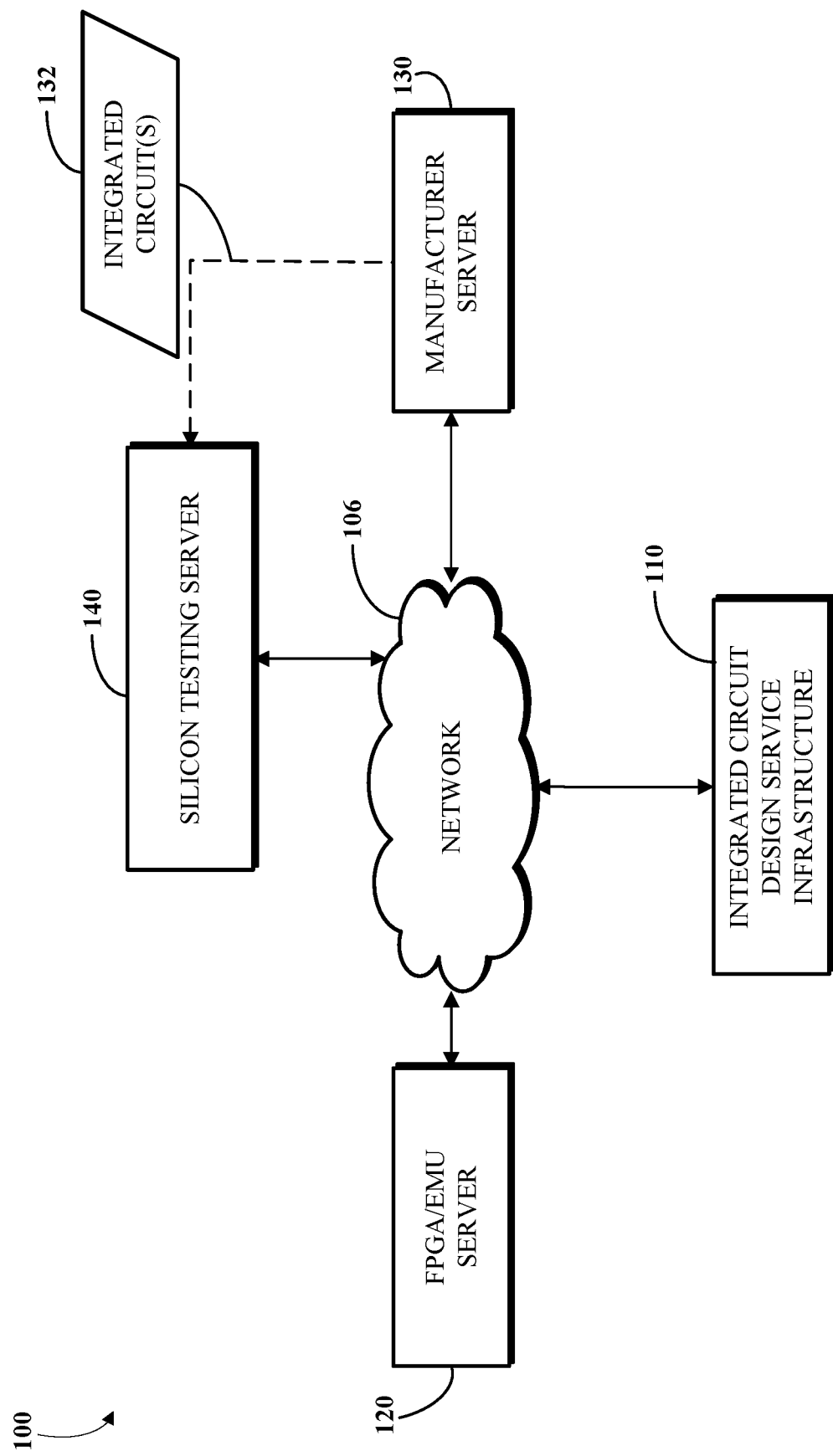
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. The processor may execute instructions out-of-order or be an on out-of-order processor. In implementations, the instructions may be vector instructions. The vector instructions may be decoded, sequenced, or cracked (collectively "sequenced") into one or more micro-operations. In the instance that a vector instruction is sequenced into multiple micro-operations, the multiple micro-operations may only differ in source registers, destination registers, and/or vector length. Moreover, each of the multiple micro-operations occupies or uses an entry in the issue queue or scheduler (collectively "issue queue'), which is a limited resource. Therefore, a mechanism is needed to maintain a defined number of the multiple micro-operations together to make more efficient use of issue queue entries and enable multiple replay of each issue queue entry.

Described are methods, logic, and circuitry which bundle micro-operations with respect to a vector instruction, dynamically allocate register blocks for a vector instruction, and track the registers using valid bits, where a valid bit indicates register readiness and/or availability, where a register refers to a physical register in a physical register file, and where a tag refers to an architectural or logical register.

In implementations, a decoder may selectively bundle and/or group a defined number of micro-operations to form a bundled micro-operation to decrease the number of entries required in an issue queue. The bundled micro-operation may occupy an issue queue entry in the issue queue. The issue queue may replay the bundled micro-operation from the issue queue entry a defined number of times. The defined number of micro-operations multiplied by the defined number of times equals the number of issue queue entries that would have been needed if the vector instruction was decoded using single micro-operations. For example, assume the vector instruction is sequenced into 8 micro-operations. This would occupy 8 issue queue entries. Now assume a bundled micro-operation can include 2 micro-operations. Therefore, the vector instruction would be sequenced into 4 bundled micro-operations. This would occupy 4 issue queue entries. Valid bits would be used to track register readiness. The issue queue would replay each bundled micro-operation twice as appropriate.

In implementations, for vector instructions amenable to block allocation, a renamer may allocate a block of registers or a register block to form a block micro-operation, where the block of registers are contiguous and in a defined modulo of alignment. That is, the block of registers can be a pair of contiguous registers, a quad of contiguous registers, and the like. Each block of registers is associated with a single tag and each register is associated with a valid bit. For example, assume the vector instruction is sequenced into 8 micro-operations. This would occupy 8 issue queue entries. Now assume a block micro-operation can include a pair of registers as described herein. Therefore, the vector instruction would be sequenced into 4 block micro-operations. This would occupy 4 issue queue entries. Valid bits would be used to track register readiness. A control bit indicates the number of micro-operations, which in this case would be two as there are a pair of registers. The issue queue would replay each block micro-operation twice as appropriate.

In implementations, a physical register file list may be searched using a single-register free list and a n-block-register free list to find free single registers and free n-block registers, respectively. In implementations, the renamer may insert a combining micro-operation to combine free single registers that are contiguous to form free n-block registers. In implementations, the renamer may insert a defragmentation or move micro-operation to defragment the physical register file. In implementations, defragmentation can be performed by actual vector micro-operation in addition to its main function, e.g., arithmetic operation. In implementations, defragmentation can be performed by multiple actual vector micro-operations in addition to their main function, e.g., arithmetic operation, by allocating their destination as contiguous registers to form free n-block registers.

To describe some implementations in greater detail, reference is first made to examples of hardware and software structures used to implement a system including components that may facilitate bundling micro-operations, dynamically allocating register blocks, and tracking the register blocks and the registers. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-9. The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
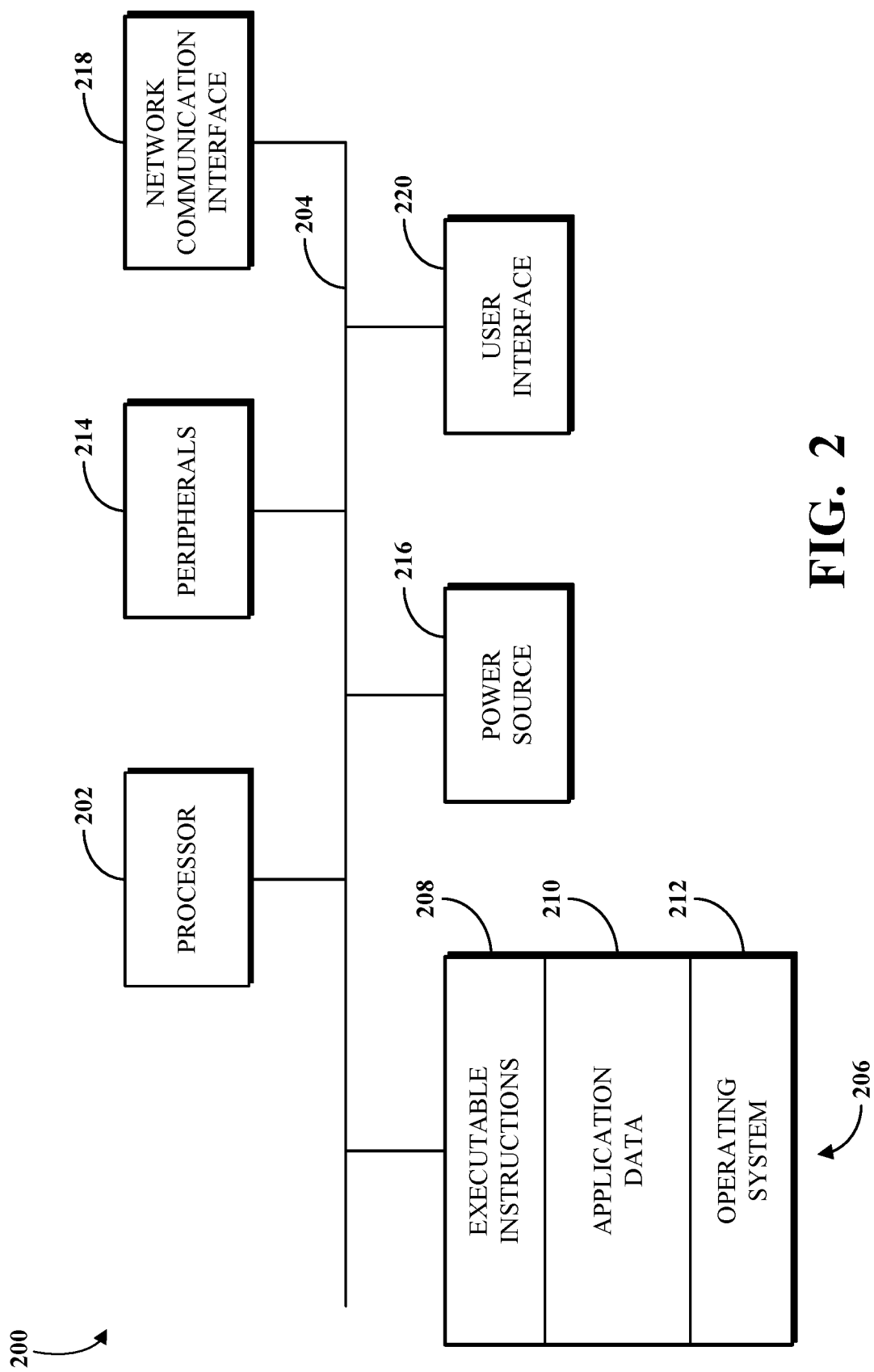
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-9. The system 200 and each component in the system 200 is illustrative and can include additional, fewer, or different components which may be similarly or differently architected without departing from the scope of the specification and claims herein. Moreover, the illustrated components can perform other functions without departing from the scope of the specification and claims herein.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
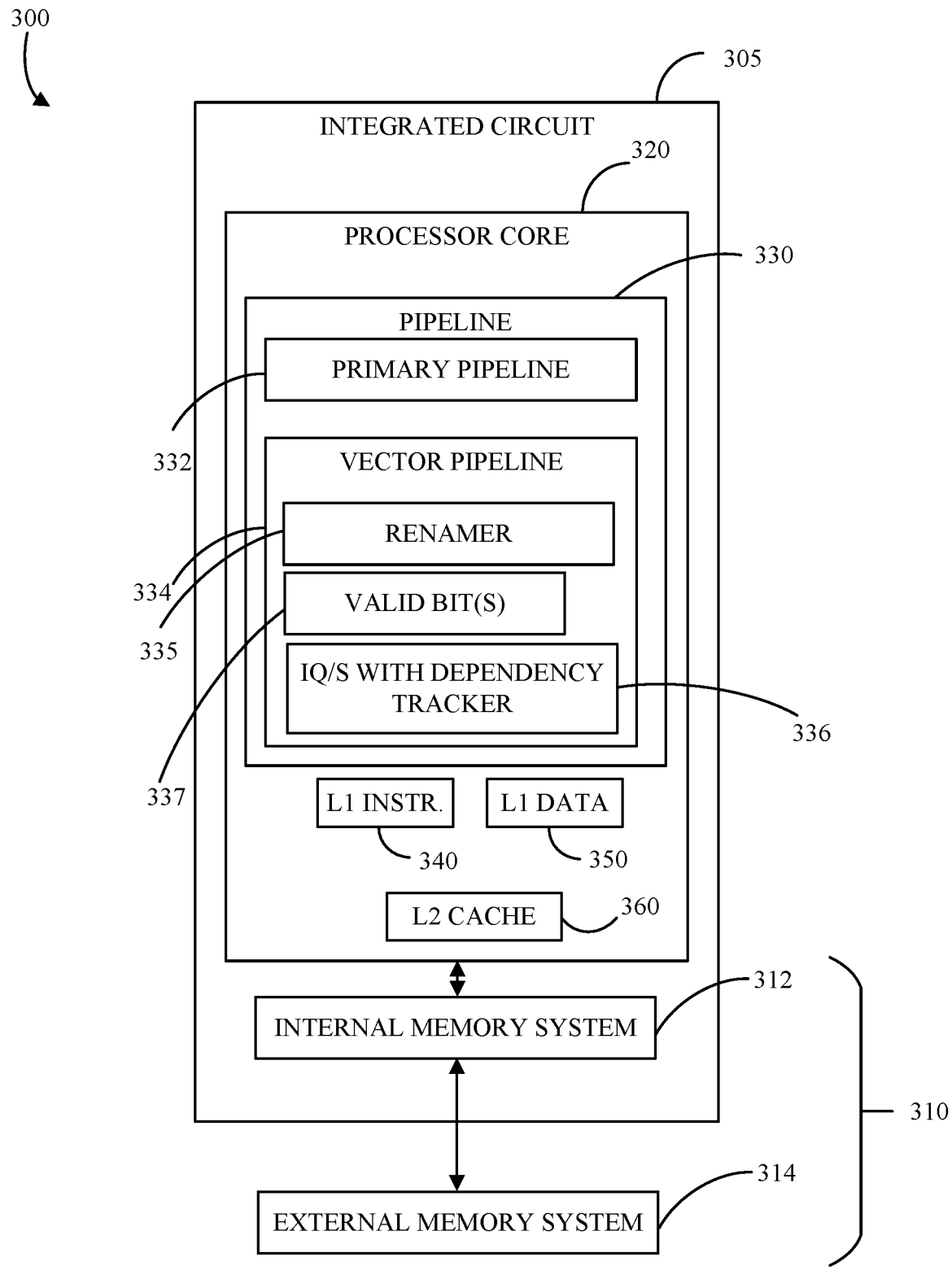
FIG. 3 is a block diagram of an example of an integrated circuit for dependency tracking and chaining for vector instructions.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 330, a level one (L1) instruction cache 340, an L1 data cache 350, and a level two (L2) cache 360 that may be a shared cache. The processor core 320 may fetch and execute instructions in the one or more pipelines 330, for example, as part of a program sequence. The instructions may cause memory requests (e.g., read requests and/or write requests) that the one or more pipelines 330 may transmit to the L1 instruction cache 340, the L1 data cache 350, and/or the L2 cache 360. In implementations, each of the one or more pipelines 330 may include a primary pipeline 332 and a vector pipeline 334. The primary pipeline 332 and the vector pipeline 334 may each have separate decode units, rename units, dispatch units, execution units, physical and/or virtual registers, caches, queues, data paths, and/or other logic associated with instruction flow. The vector pipeline 334 may include a renamer 335 and an issue queue or instruction scheduler (IQ/S) with dependency tracking logic and/or circuit 336 which use valid bit(s) 337 to facilitate dependency tracking for vector instructions, bundled micro-operations, and/or block micro-operations as described herein. In some implementations, the primary pipeline 332 and the vector pipeline 334 may be out-of-order pipelines. The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
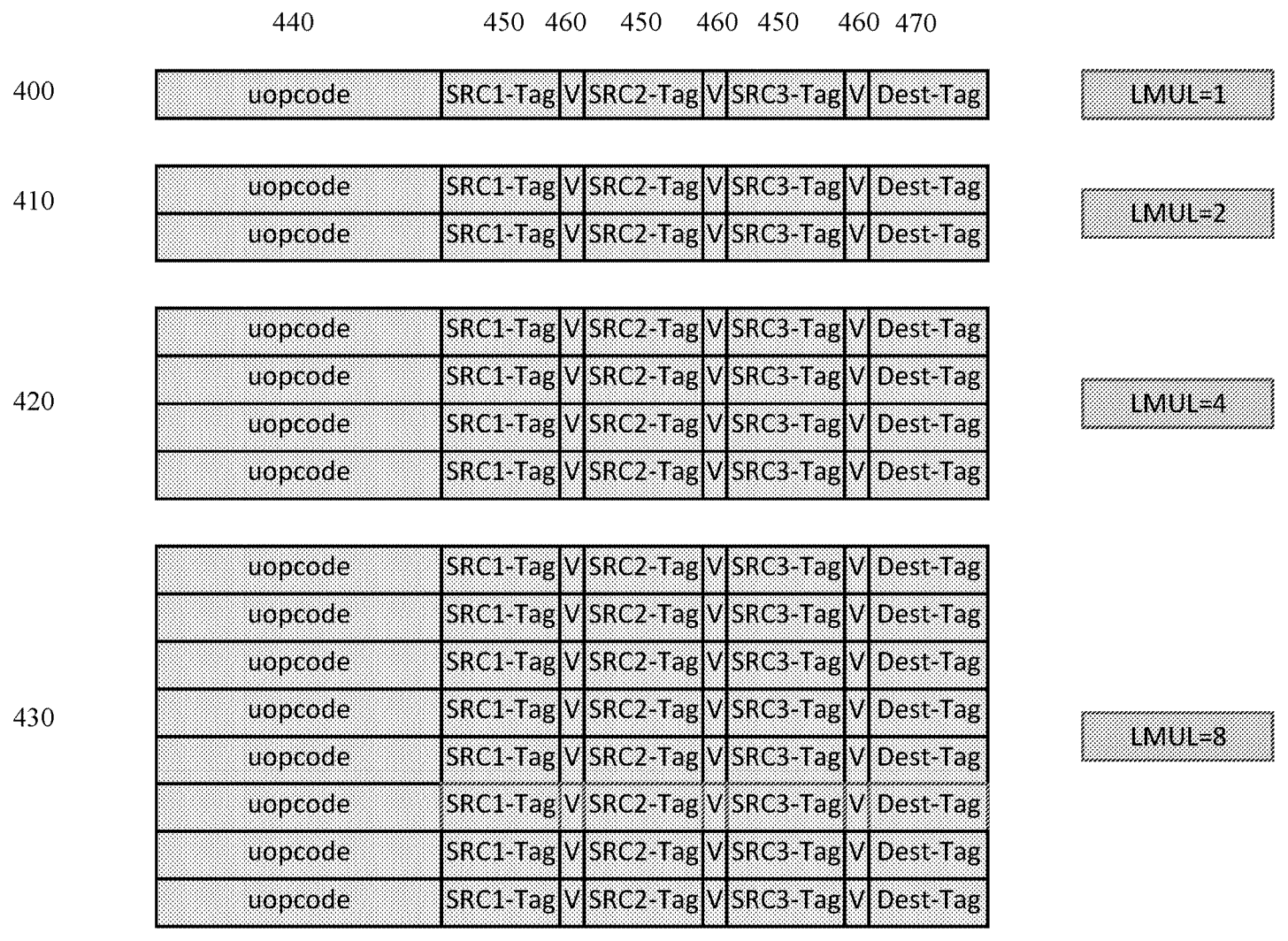

The system 300 and the components therein support vector instructions which are sequenced into a number of micro-operations typically based upon vector length or a length multiplier (LMUL) as shown in Table 1 and FIG. 4. Table 1 shows an example of vector sequencing, i.e., micro-operation generation from a vector instruction. In this instance, the vector operation is a vector add which is sequenced into 8 micro-operations.

TABLE 1

Length Multiplier = 8, where Length Multiplier specifies the number of vector registers that are grouped
Macro instruction: vadd.vv v16, v8, v0
Micro-op:
vadd.vv v16, v8, v0
vadd.vv v17, v9, v1
vadd.vv v18, v10, v2
vadd.vv v19, v11, v3
vadd.vv v20, v12, v4
vadd.vv v21, v13, v5
vadd.vv v22, v14, v6
vadd.vv v23, v15, v7

Note:
Not all configuration information is provided for ease of illustration.

FIG. 4 are diagrams of example micro-operation(s) generated from a vector instruction based on different length multipliers, namely, a micro-operation (uop) 400 for a length multiplier equal to 1, micro-operations 410 for a length multiplier equal to 2, micro-operations 420 for a length multiplier equal to 4, and micro-operations 430 for a length multiplier equal to 8. Each of the micro-operations 400, 410, 420, and 430 include a micro-operation code (uopcode) 440 for identifying a type of instruction, one or more source registers with a tag 450 and a valid bit 460, and a destination register with a tag 470. Notably, as the length multiplier gets larger, the vector instruction is cracked into more micro-operations, which in turn takes more issue entries or slots in the IQ/S 336, for example. Availability of issue queue entries are important for an out-of-order machine. Ideally, the IQ/S 336 may be made larger, but this can add logic and impact frequency or overall processing time.

Figure 5:
FIG. 5 is a diagram of an example micro-operation which supports all length multipliers.

Since all the uopcodes are often the same, a micro-operation may be allocated a single entry in the IQ/S which is replayed multiple times with different source registers and destination registers for each iteration, i.e., effectively "sequencing micro-operations" in the IQ/S. The single micro-operation would need to track more source registers and determine which of the "sequenced micro-operations" have their resources ready and can be picked for execution. FIG. 5 is a diagram of an example micro-operation structure 500 which supports all the LMULs (e.g., 1, 2, 4, and 8) in a single IQ/S entry. This may be referred to as a super bundled micro-operation. In this implementation, given a maximum value of LMUL=8, the IQ/S 336 would need to track eight times the number of source registers in comparison to FIG. 4. The micro-operation structure 500 includes an uopcode 510 for identifying a type of instruction, 24 source registers with a tag 520 and a valid bit 530, and 8 destination registers with a tag 540. The micro-operation structure 500 occupies a single IQ/S entry that is wider than before with more source tag comparators. In implementations, the values for LMUL can be different and the super bundled micro-operation is configured to handle all LMULs for a given system.

Figure 6:
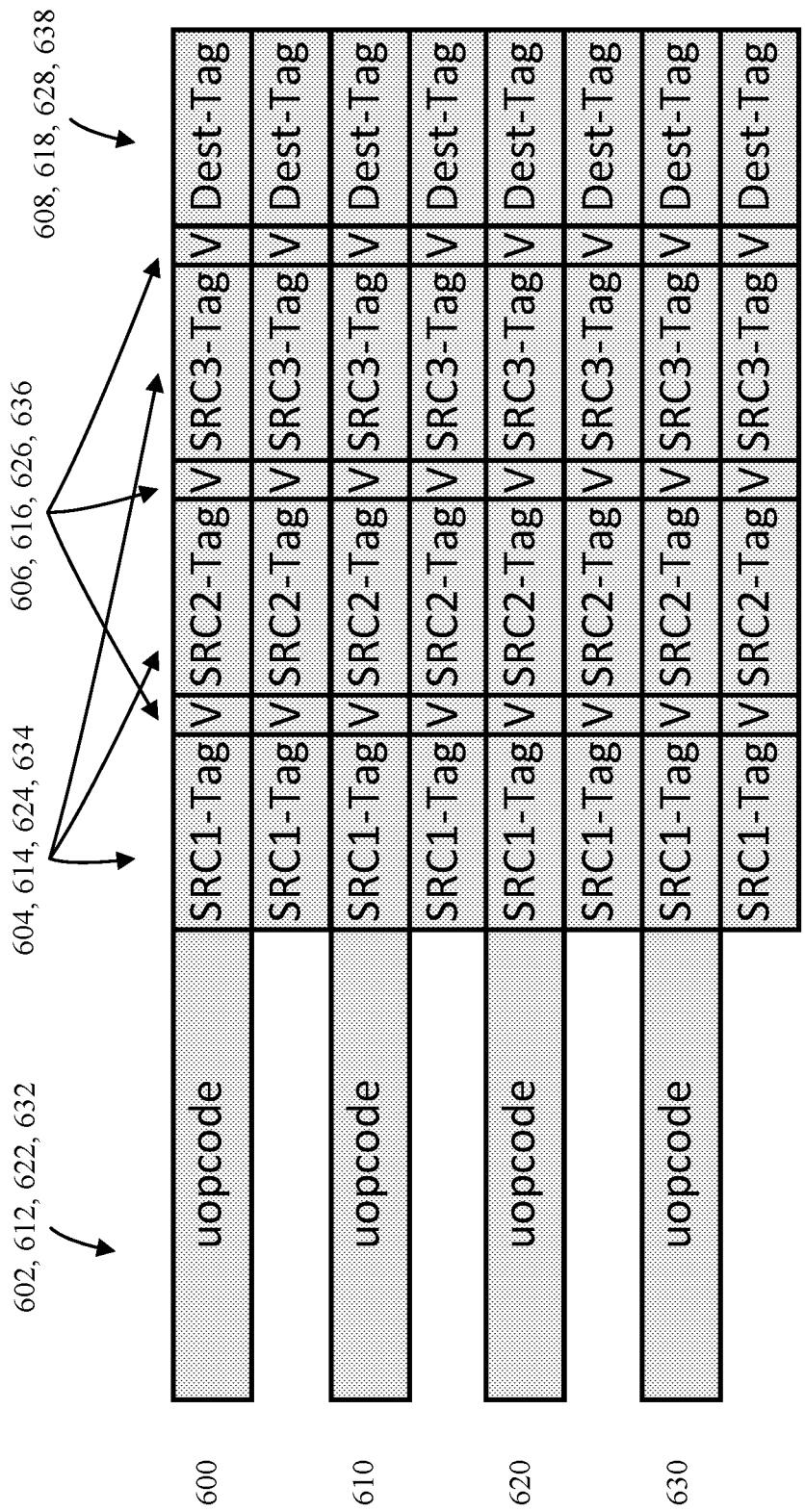
FIG. 6 is a diagram of an example of a bundled micro-operation.

For LMULs less than 8, the micro-operation structure 500 is not fully used. FIG. 6 is a diagram of an example of bundled micro-operations 600, 610, 620, and 630. In general, each bundled micro-operation has a defined number of micro-operations that are replayed the defined number of times by the IQ/S. The number of bundled micro-operations cracked from the vector instruction is equal to the number of micro-operations that would have been cracked as single micro-operations. For example, as shown in FIG. 6, the defined number of micro-operations in a bundle (i.e., a bundle size) is two (2). In this instance, for LMUL=8, the decoder may crack the vector instruction into four (4) bundled micro-operations and the IQ/S can replay each bundled micro-operation two (2) times. Each of the bundled micro-operations 600, 610, 620, and 630 include an uopcode 602, 612, 622, 632, respectively, for identifying a type of instruction, source registers with a tag 604, 614, 624, 634, respectively, and a valid bit 606, 616, 626, 636, respectively, and a destination register with a tag 608, 618, 628, 638, respectively. This improves micro-operation efficiency for the LMUL=1 and LMUL=2 cases (reducing the number of bits and comparators per entry), and still reduces the total number of IQ/S entries needed for the LMUL=4 and LMUL=8 cases (i.e., the entries are cut in half).

Figure 7:
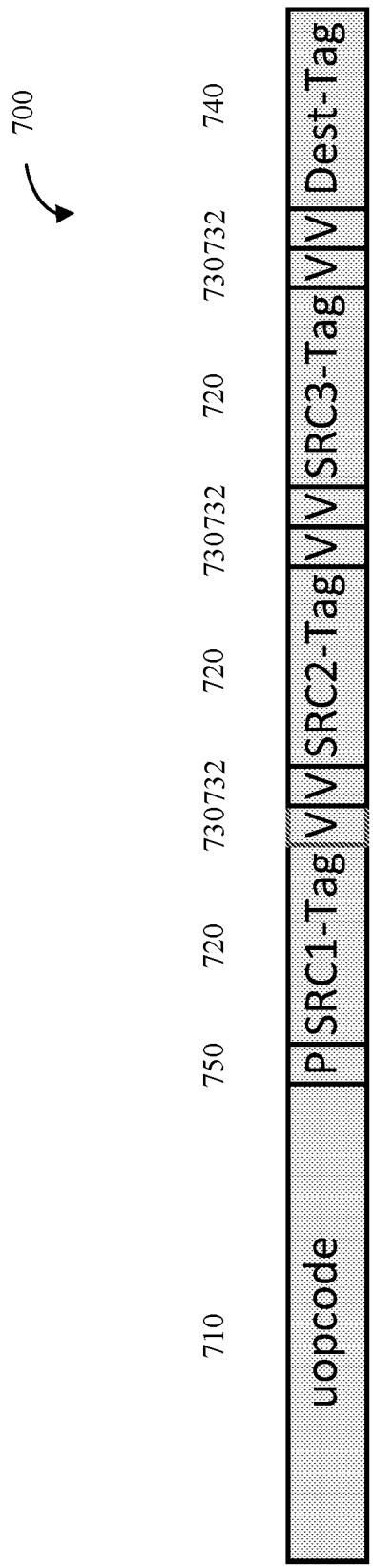
FIG. 7 is a diagram of an example of a block micro-operation.

Further optimizations may be available in a physical register file design, where architectural registers typically map onto a much larger physical register file via the renamer. Physical register file entries are handled as individual elements. Given a vector architecture which includes length multipliers (i.e., LMUL=2, 4, or 8), there is an optimization with respect to blocks of registers. In this instance, instead of renaming just individual registers, a defined number of block of registers, e.g., a pair or quad of registers, can be renamed. The defined number or block size is configurable for a system. This may be enabled by maintaining a free list for allocating individual physical registers to be used for renaming and a free list for a defined number of aligned blocks of registers, e.g., aligned and adjacent pairs of physical registers, to be used for renaming. FIG. 7 is a diagram of an example of a block micro-operation 700, which occupies a single IQ/S entry in contrast to micro-operation 600, for example. The block size is two (2). The block micro-operation 700 includes an uopcode 710 for identifying a type of instruction, source registers with a tags 720, and a pair of valid bits 730, 732, one for each source register, and a destination register with a tag 740. A block bit 750 indicates the number of micro-operations represented by the uopcode 710 or the block size used by the block micro-operation 700. In this instance, the block bit 750 is represented by a "P" for a pair of micro-operations or that a pair of registers were renamed. In this instance, the second valid 732 indicates whether the second register of the pair is valid. The single IQ/S entry is replayed twice in this instance by the IQ/S. In implementations, the micro-operation structure 500 may include a block bit similar to the block bit 750 to indicate the number of micro-operations by the uopcode 510. In implementations, the bundled micro-operations 600, 610, 620, and 630 may each include a block bit similar to the block bit 750 to indicate the number of micro-operations by the uopcodes 602, 612, 622, and 632, respectively.

LMULs of all sizes need to be accommodated when using bundled micro-operations and block micro-operations. In implementations, in addition, to the bundled micro-operation which may have a bundle size of greater than two (2) and the block micro-operation which may have a block size of greater than two (2), there is a single micro-operation option when LMUL is one (1).

In implementations, it is architecturally legal for the integrated circuit and components therein to write registers using LMUL=1 instructions which are later used as sources for an LMUL=2 instruction. As such, provisions are needed to handle LMUL=2 instructions when the sources are not made up of pairs. In implementations, the integrated circuit and components therein can insert a combining micro-operation (which reads the two single registers and copies them into an aligned adjacent pair). In implementations, the micro-operation insertion may be done by a renamer, such as the renamer 335 in FIG. 3 or the renamer 920 in FIG. 9. In implementations, the decoder may recognize the scenario and crack the vector instruction using only single register micro-operations. In this later case, the destination registers can be renamed using aligned adjacent pairs even across the two single register micro-operations.

Figure 8:
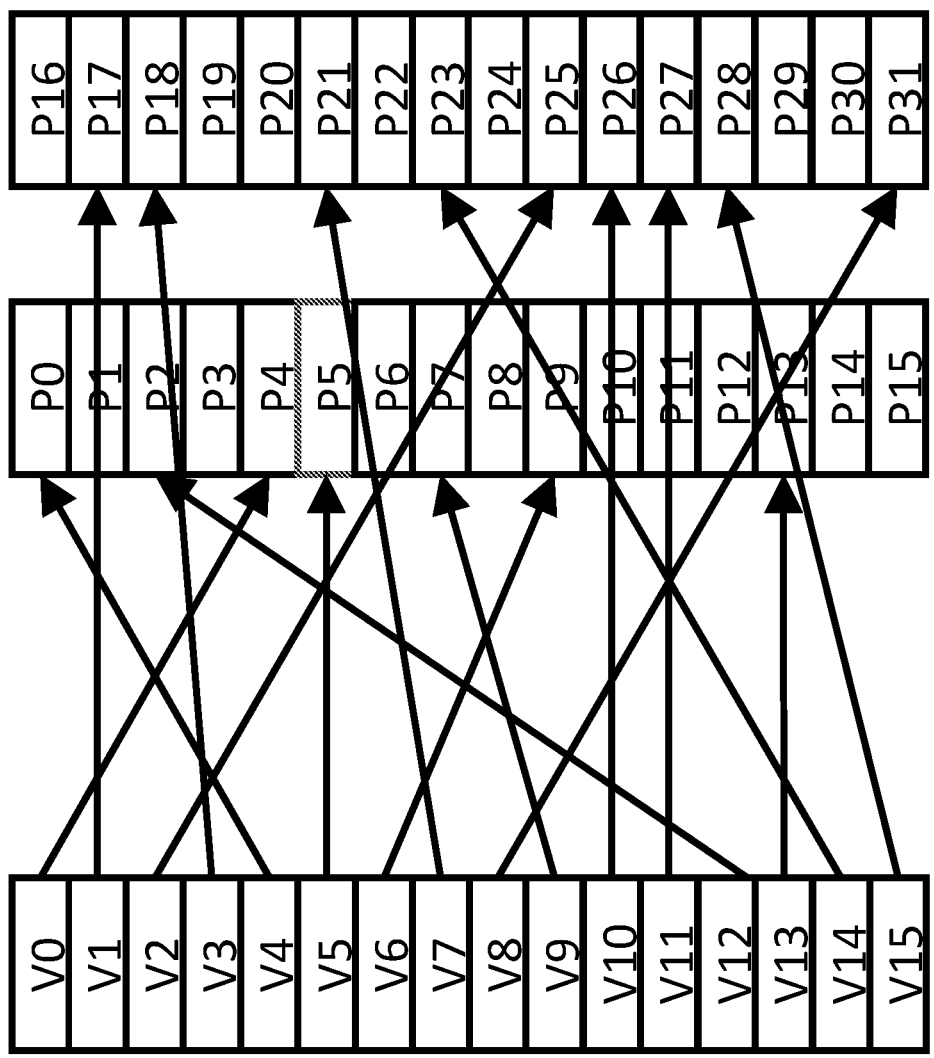
FIG. 8 is a diagram of an example of register allocations.

In a physical register file design, the renamer can allocate for a vector instructions any register in the physical register file as a destination. Consequently, the renamer may find it difficult to find aligned adjacent pairs, for example. FIG. 8 illustrates the mapping for only a few registers. Imagine when the number of renamed registers is nearly as great as the number of physical registers.

In implementations, to assist in the finding of defined blocks of registers, two file free lists may be used. A single-register file free list which includes free single registers. A register-block size free list which includes free blocks of registers.

In implementations, a defragmentation micro-operation may be inserted (for example by the renamer) to defragment or pack the single registers and free up aligned register-block size registers, e.g., aligned adjacent pairs for use with a pair of micro-operations. The defragmentation micro-operation based upon being in a LMUL-2, 4, or 8 mode (e.g., recognizing that vector instructions are coming which have LMUL-2, 4, or 8, block free list pressure, or a repeated static source not being in a block) and that appropriate blocks of registers may not be available.

In implementations, the super bundled micro-operation, the bundled micro-operation, and the block micro-operation are all types of reduced IQ/S entry micro-operations. The reduced IS/Q entry micro-operations use less IQ/S entries in contrast to sequencing each micro-operation separately from a vector instruction and allocating an entry for each micro-operation.

Figure 9:
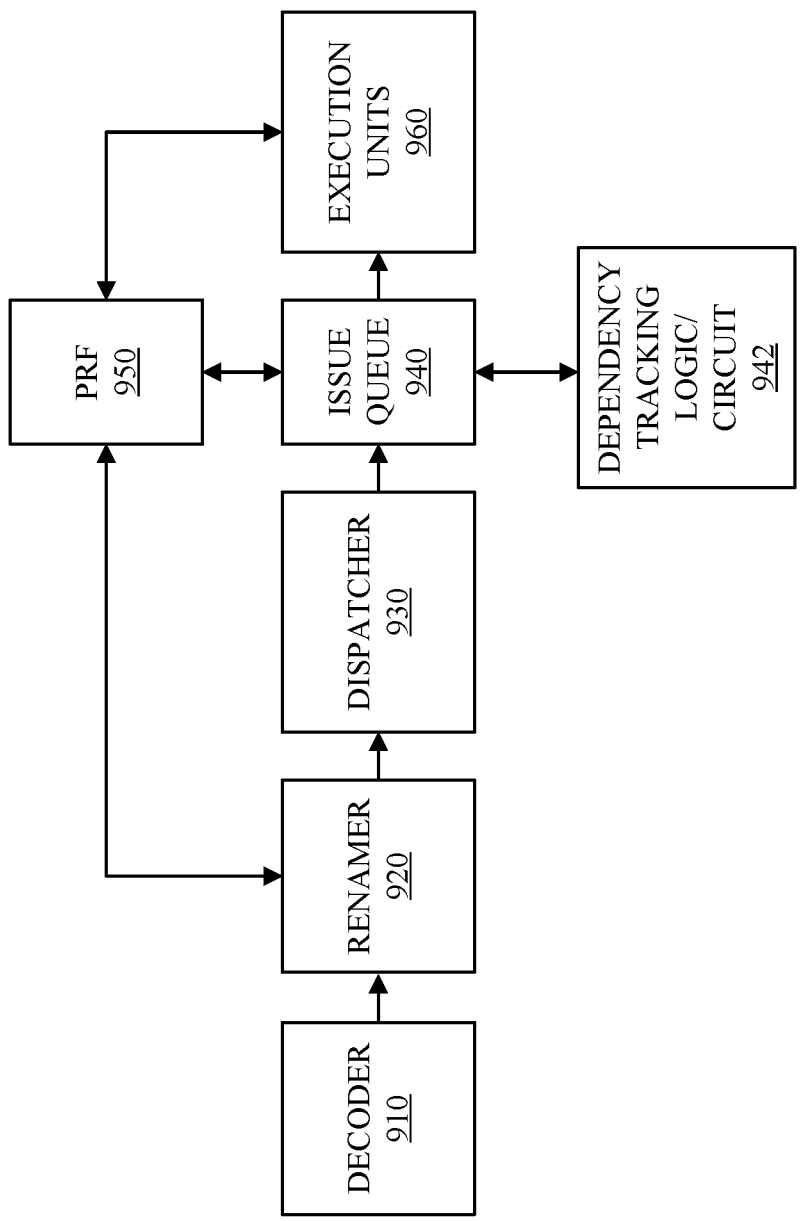
FIG. 9 is a block diagram illustrating an integrated circuit and flow for bundling, dynamic allocation of register blocks, and tracking.

FIG. 9 is a block diagram of a processor or system 900 which illustrates processing flow between a decoder 910, a renamer 920, a dispatcher 930, an IQ/S 940, a physical register file 950, and execution unit 960 for bundling, dynamic allocation of register blocks, and tracking. The system 900 could be a pipeline as shown in FIG. 3. The system 900 and each component in the system 900 is illustrative and can include additional, fewer, or different components which may be similarly or differently architected without departing from the scope of the specification and claims herein. Moreover, the illustrated components can perform other functions without departing from the scope of the specification and claims herein.

The decoder 910 is responsible, in relevant part, for receiving and decoding an instruction, such as a vector instruction, into micro-operations including for example, bundled micro-operations or block micro-operations, as appropriate and applicable.

The renamer 920 is responsible, in relevant part, for renaming the register specifiers in an instruction by mapping them to a new space of physical registers in the physical register file 950. The renamer can rename single or defined blocks of registers, as appropriate and applicable, for bundled micro-operations or block micro-operations, as appropriate and applicable. The valid bits can be set, as appropriate and applicable. In implementations, the renamer can insert micro-operations to defragment the physical register file mappings, convert single registers to blocks of registers, as appropriate and applicable, and use a free list for single registers and a free list for blocks of registers.

The dispatcher 930 is responsible, in relevant part, for dispatching the micro-operations for execution.

The IQ/S 940 is responsible, in relevant part, for issuing a micro-operation when data is ready for the micro-operation. The IQ/S 940 can include a tracking logic and/or circuit 942 to track readiness of identified valid bits for associated sources for the micro-operation.

The execution unit 960 is responsible, in relevant part, for executing the micro-operation when the data is ready for the micro-operation.

Figure 10:
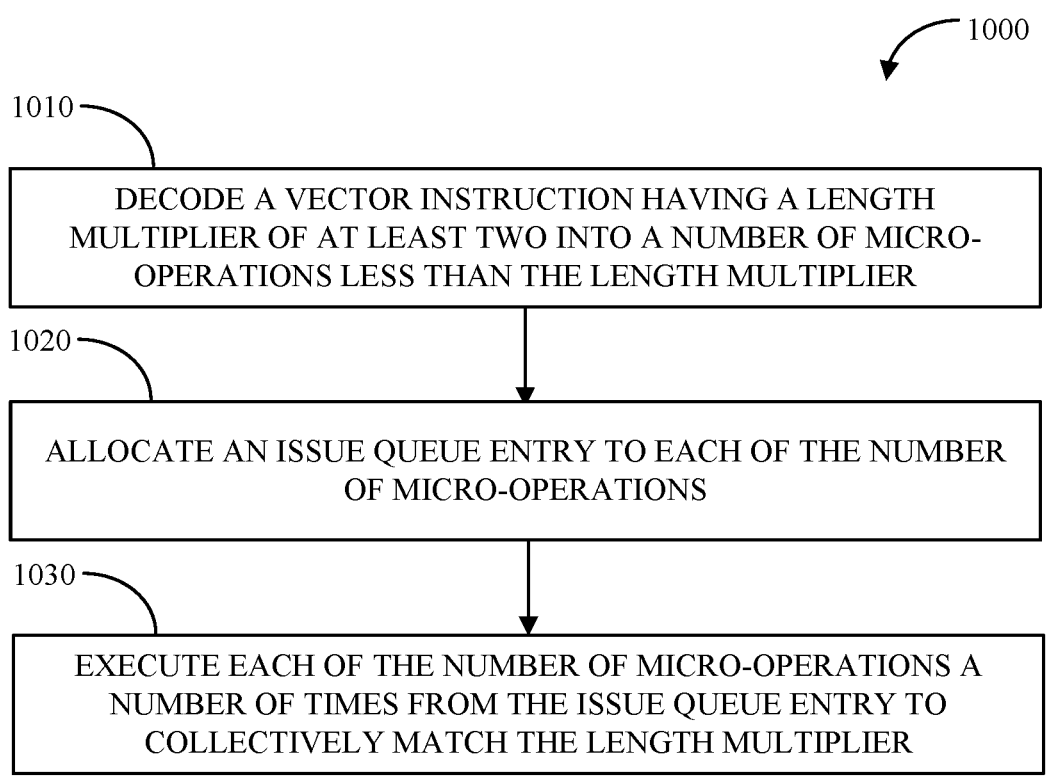
FIG. 10 is a flow chart of a method for bundling, dynamic allocation of register blocks, and tracking.

FIG. 10 is a flow chart of a method for bundling, dynamic allocation of register blocks, and tracking for vector instructions. The method 1000 may include: decoding 1010 a vector instruction having a length multiplier of at least two into a number of micro-operations less than the length multiplier; allocating 1020 an issue queue entry to each of the number of micro-operations; and executing 1030 each of the number of micro-operations a number of times from the issue queue entry to collectively match the length multiplier.

The method 1000 may be performed in the system 300 of FIG. 3 and/or system 900 of FIG. 9, and/or components therein.

The method 1000 may include decoding 1010 a vector instruction having a length multiplier of at least two into a number of micro-operations less than the length multiplier. A vector instruction may have a length multiplier. The length multiplier may have a value of 1, 2, 4, or 8. In implementations, the value of the length multiplier may vary depending on the system. In the event that the value of the length multiplier is one, the decoder may decode the vector instruction into one micro-operation. In the event that the value of the length multiplier is greater than one, the decoder may decode the vector instruction into a number of micro-operations less than the length multiplier. This decreases the number of entries needed in the IQ/S. In implementations, the decoder may select from a bundle size of 2 when the value of the length multiplier is two, may select from a bundle size of 2 or 4 when the value of the length multiplier is four, or may select from a bundle size of 2, 4, or 8 when the value of the length multiplier is eight. For each source in a bundled micro-operation(s), the registers are associated with a single tag. In bundled micro-operations, single register renaming is used. In implementations, the decoder may select from a block size of 2 when the value of the length multiplier is two, may select from a block size of 2 or 4 when the value of the length multiplier is four, or may select from a block size of 2, 4, or 8 when the value of the length multiplier is eight. In the latter instance, a renamer may rename blocks of registers depending on the block size. For each source, the block of registers are associated with a single tag. The renamer may set a bit in the micro-operation indicating that blocks of registers are being renamed. The blocks of registers are contiguous blocks of registers in the physical register file. The renamer may use multiple free lists, one to search for single registers and one to search for contiguous registers for each defined block size. Valid bit(s) are generated for each register to indicate readiness of the source registers.

The method 1000 may include allocating 1020 an issue queue entry to each of the number of micro-operations. The IQ/S may allocate one or more entries depending on how the vector instruction is cracked.

The method 1000 may include executing 1030 each of the number of micro-operations a number of times from the issue queue entry to collectively match the length multiplier. The IQ/S may issue an entry for execution when the valid bits indicate source register readiness. An entry, in the case of length multipliers greater than one, may execute more than once such that the total number of executions from the decoded micro-operations match the number of length multiplier. For example, when a value for a length multiplier is 8, there may be four bundled micro-operations when the bundle size is 2. Each bundled micro-operation would execute or replay twice. Therefore, the total number of executions from the decoded micro-operations matches the value 8 of the length multiplier. For example, when a value for a length multiplier is 8, there may be two block micro-operations when the block size is 4. Each block micro-operation would execute or replay four times. Therefore, the total number of executions from the decoded micro-operations matches the value 8 of the length multiplier. In other words, the number of replays is less than the length multiplier.

Described herein is circuitry which bundle micro-operations with respect to a vector instruction, dynamically allocate register blocks for a vector instruction, and track the registers using valid bits. In implementations, an integrated circuit includes a decoder configured to decode a vector instruction having a length multiplier of at least two into a number of micro-operations less than the length multiplier, and an issue queue. The issue queue configured to allocate an issue queue entry to each of the number of micro-operations and issue for execution each of the number of micro-operations a number of times from the issue queue entry to collectively match the length multiplier.

In implementations, the decoder is further configured to bundle micro-operations into the number of micro-operations based on a bundle size and using single register renaming. In implementations, the bundle size is a factor of the length multiplier. In implementations, the decoder is further configured to generate the number of micro-operations based on a block register size and using block register renaming. In implementations, the block register size is a factor of the length multiplier. In implementations, the integrated circuit further comprising a renamer configured to rename blocks of registers in accordance with the block register size, where the blocks of registers are contiguous registers in a physical register file. In implementations, the integrated circuit further comprising a single register free list and a block register size free list, where the renamer is configured to search for a single register or a block of registers based on a type of micro-operation. In implementations, the renamer is configured to insert a defragmentation micro-operation to defragment the physical register file. In implementations, the renamer is configured to insert a combining micro-operation to form the blocks of registers in accordance with the block register size using appropriate single registers in the physical register file. In implementations, the decoder further configured to generate a valid bit for each register in each of the number of micro-operations to indicate a readiness for execution.

Described herein is a method which bundle micro-operations with respect to a vector instruction, dynamically allocate register blocks for a vector instruction, and track the registers using valid bits. In implementations, the method includes decoding, by a decoder, a vector instruction having a length multiplier of at least two into a number of micro-operations less than the length multiplier, allocating, by an issue queue, an issue queue entry to each of the number of micro-operations, and executing, by the issue queue with execution units, each of the number of micro-operations a number of times from the issue queue entry to collectively match the length multiplier.

In implementations, the method further including bundling, by the decoder, micro-operations into the number of micro-operations based on a bundle size and using single register renaming. In implementations, the bundle size is a factor of the length multiplier. In implementations, the method further including generating, by the decoder, the number of micro-operations based on a block register size and using block register renaming. In implementations, the block register size is a factor of the length multiplier. In implementations, the method further including renaming, by a renamer, blocks of registers in accordance with the block register size, where the blocks of registers are contiguous registers in a physical register file. In implementations, the method further including searching, by the renamer, a single register free list for single registers based on a first type of micro-operation, and searching, by the renamer, a block register size free list to search for a block of registers based on a second type of micro-operation. In implementations, the method further including inserting, by the renamer, a defragmentation micro-operation to defragment the physical register file. In implementations, the method further including inserting, by the renamer, a combining micro-operation to form the blocks of registers in accordance with the block register size using appropriate single registers in the physical register file. In implementations, the method further including inserting, by the renamer, a micro-operation with a length multiplier greater than one to form the blocks of registers in accordance with the block register size by allocating consecutive destination registers in the physical register file.

Described herein is a method which bundle micro-operations with respect to a vector instruction, dynamically allocate register blocks for a vector instruction, and track the registers using valid bits. In implementations, a non-transitory computer readable medium comprising a circuit representation that, when processed by a computer, is used to program or manufacture an integrated circuit, including a decoder configured to decode a vector instruction having a length multiplier of at least two into a number of micro-operations less than the length multiplier; and an issue queue configured to allocate an issue queue entry to each of the number of micro-operations and issue for execution each of the number of micro-operations a number of times from the issue queue entry to collectively match the length multiplier.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit comprising:
    a decoder to:
        decode a vector instruction into micro-operations; and
        bundle micro-operations into bundled micro-operations, wherein:
            the vector instruction is associated with a length multiplier;
            the length multiplier is at least two; and
            a number of the bundled micro-operations is less than the length multiplier; and
    an issue queue to:
        allocate an issue queue entry to each of the bundled micro-operations; and
        execute each of the bundled micro-operations a number of times from the issue queue entry, wherein the number of times multiplied by the number of the bundled micro-operations is equal to the length multiplier.

2. The integrated circuit of claim 1, wherein the decoder is further to bundle micro-operations based on a bundle size and using single register renaming.

3. The integrated circuit of claim 2, wherein the bundle size is a factor of the length multiplier.

4. The integrated circuit of claim 1, wherein the decoder is further to generate the bundled micro-operations based on a block register size and using block register renaming.

5. The integrated circuit of claim 4, wherein the block register size is a factor of the length multiplier.

6. The integrated circuit of claim 5, further comprising a renamer to rename blocks of registers in accordance with the block register size, wherein the blocks of registers are contiguous registers in a physical register file.

7. The integrated circuit of claim 6, further comprising:
a single register free list; and
a block register size free list,
wherein the renamer is to search for a single register or a block of registers based on a type of micro-operation.

8. The integrated circuit of claim 6, wherein the renamer is to insert a defragmentation micro-operation to defragment the physical register file.

9. The integrated circuit of claim 6, wherein the renamer is to insert a combining micro-operation to form the blocks of registers in accordance with the block register size using appropriate single registers in the physical register file.

10. The integrated circuit of claim 1, the decoder is further to generate a valid bit for each register in each of the number of the bundled micro-operations to indicate a readiness for execution.

11. A method comprising:
decoding, by a decoder, a vector instruction into micro-operations;
bundling micro-operations into bundled micro-operations, wherein:
the vector instruction is associated with a length multiplier;
the length multiplier is at least two; and
a number of the bundled micro-operations less than the length multiplier; and
allocating, by an issue queue, an issue queue entry to each of the bundled micro-operations; and
executing, by the issue queue with execution units, each of the bundled micro-operations a number of times from the issue queue entry, wherein the number of times multiplied by the number of the bundled micro-operations is equal to the length multiplier.

12. The method of claim 11, wherein said bundling micro-operations into bundled micro-operations is based on a bundle size and using single register renaming.

13. The method of claim 12, wherein the bundle size is a factor of the length multiplier.

14. The method of claim 11, wherein said bundling micro-operations into bundled micro-operations is based on a block register size and using block register renaming.

15. The method of claim 14, wherein the block register size is a factor of the length multiplier.

16. The method of claim 15, further comprising:
renaming, by a renamer, blocks of registers in accordance with the block register size, wherein the blocks of registers are contiguous registers in a physical register file.

17. The method of claim 16, further comprising:
searching, by the renamer, a single register free list for single registers based on a first type of micro-operation; and
searching, by the renamer, a block register size free list to search for a block of registers based on a second type of micro-operation.

18. The method of claim 17, further comprising:
inserting, by the renamer, a defragmentation micro-operation to defragment the physical register file.

19. The method of claim 17, further comprising:
inserting, by the renamer, a combining micro-operation to form the blocks of registers in accordance with the block register size using appropriate single registers in the physical register file.

20. The method of claim 17, further comprising:
inserting, by the renamer, a micro-operation with a length multiplier greater than one to form the blocks of registers in accordance with the block register size by allocating consecutive destination registers in the physical register file.

21. A non-transitory computer readable medium comprising a circuit representation that, when processed by a computer, is used to program or manufacture an integrated circuit, comprising:
a decoder to:
decode a vector instruction into micro-operations; and
bundle micro-operations into bundled micro-operations, wherein:
the vector instruction is associated with a length multiplier;
the length multiplier is at least two; and
a number of the bundled micro-operations is less than the length multiplier; and
an issue queue to:
allocate an issue queue entry to each of the bundled micro-operations; and
execute each of the bundled micro-operations a number of times from the issue queue entry, wherein the number of times multiplied by the number of the bundled micro-operations is equal to the length multiplier.

* * * * *